Dec. 14, 1937.   J. A. GAYLORD   2,102,065
SEED GATHERER ATTACHMENT FOR MOWING MACHINES
Original Filed May 9, 1936   3 Sheets-Sheet 1

Inventor
J. A. Gaylord
By Clarence A. O'Brien and
Hyman Berman
Attorney

Dec. 14, 1937.   J. A. GAYLORD   2,102,065
SEED GATHERER ATTACHMENT FOR MOWING MACHINES
Original Filed May 9, 1936   3 Sheets-Sheet 2

Inventor
J. A. Gaylord

By Clarence A. O'Brien and
Hyman Berman
Attorneys

Dec. 14, 1937.  J. A. GAYLORD  2,102,065
SEED GATHERER ATTACHMENT FOR MOWING MACHINES
Original Filed May 9, 1936    3 Sheets—Sheet 3

Inventor
J. A. Gaylord

By Clarence A. O'Brien and
Hyman Berman
Attorneys

Patented Dec. 14, 1937

2,102,065

UNITED STATES PATENT OFFICE 2,102,065

SEED GATHERER ATTACHMENT FOR MOWING MACHINES

James A. Gaylord, Sharon, Tenn., assignor of one-third to Lillie Gaylord, Sharon, Tenn.

Application May 9, 1936, Serial No. 78,902
Renewed September 20, 1937

2 Claims. (Cl. 56—207)

This invention relates to new and useful improvements in means for gathering seed.

The principal object of the present invention is to provide an attachment for conventional mowing machines which employs a jostling mechanism for agitating the material cut in such a manner that the material will not hang or clog in the mechanism which now frequently occurs in conventional seed gathering mechanism, resulting in the requirement that the mower be stopped and the gathering mechanism cleaned out.

During the course of the following specification other important objects and advantages of the invention will become apparent to the reader.

Figure 2:
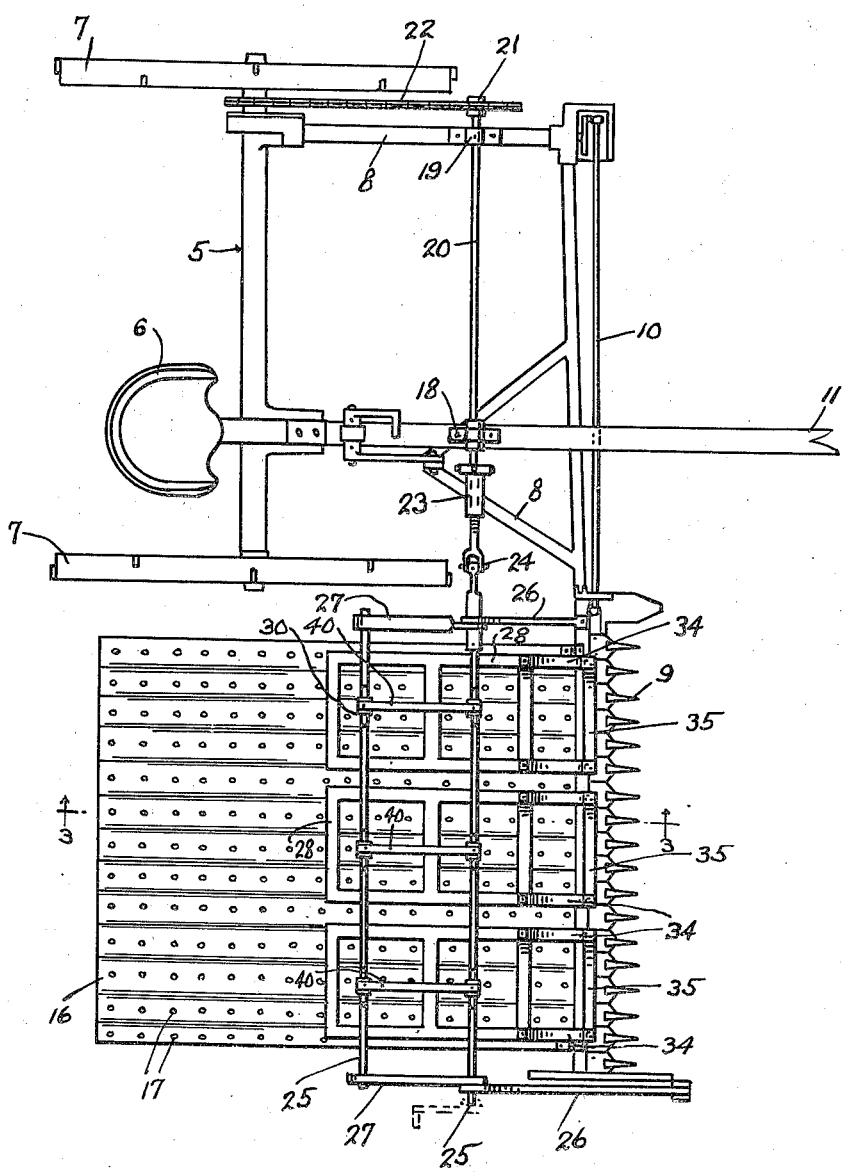
Figure 2 represents a top plan view of the attachment and mower.
Figure 4:
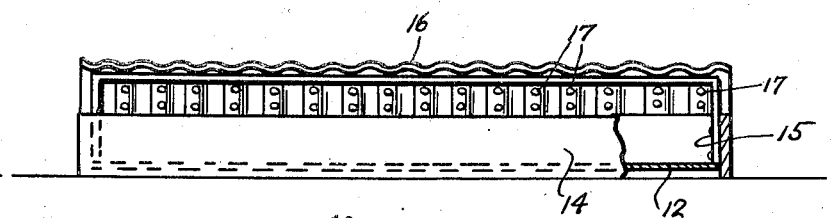
Figure 4 is a rear end elevational view of the gathering pan and sieve with a part broken away.

Referring to the drawings wherein like numerals designate like parts, it can be seen in Figure 2, that numeral 5 generally refers to the conventional mower mechanism which involves the operator seat 6, the usual ground engaging wheels 7—7 and the frame work 8 for supporting the conventional cutter bar 9 and drive mechanism 10. Numeral 11 represents the usual draft tongue.

Figure 3:
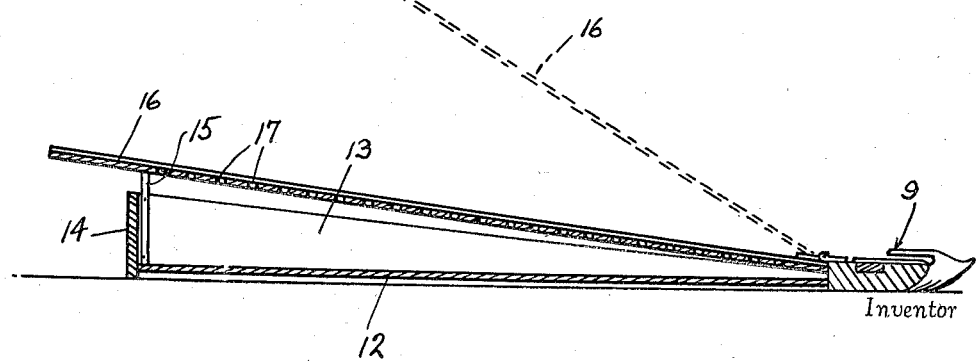
Figure 3 is a vertical sectional view on line 3—3 of Figure 2.

In carrying out the present invention, it can be seen in Figure 3, that numeral 12 represents the seed pan which extends rearwardly from the cutter bar generally referred to by numeral 9. This pan 12 is provided with rearwardly sloping side walls 13 and the back wall 14 connecting the said side walls 13.

Elevated by suitable risers 15 is the corrugated sieve 16, the grooves of which are provided with perforations 17 therein through which seed can pass to reach the pan 12.

Further referring to the present invention, it can be seen that the frame of the mower machine 5 is provided with bearings 18—19 through which the horizontal shaft 20 is journalled. One end of the shaft 20 is provided with a socket wheel 21 and over this and a sprocket on the axle of the wheel 7 is trained the chain 22.

The opposite end of the shaft 20 is connected by way of the turnbuckle structure 23 and the universal joint 24 to one end of one of the crank shafts 25.

Figure 1:
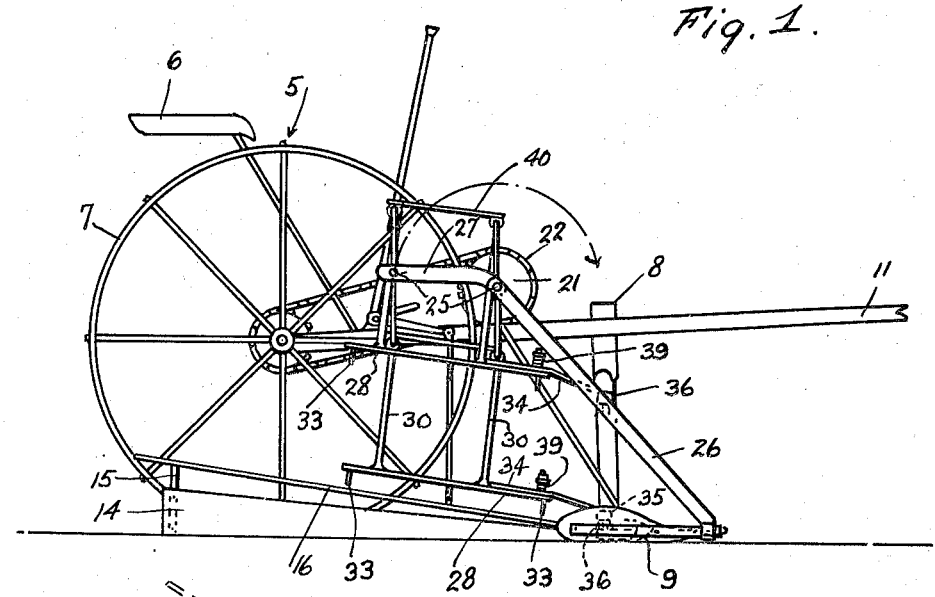
Figure 1 represents a side elevational view of the seed gathering attachment on a mower.

As is shown in Figures 1 and 2, the opposite ends of the bore bar 9 are provided with upstanding posts 26 which at their upper ends are provided with hanger bars 27 through which the ends of the crank shafts 25—25 are journalled.

These crank shafts 25—25 are each provided with cranks $a$, $b$ and $c$ radiating from the crank shaft on planes of one hundred and twenty degrees angularity with respect to each other.

Situated under the crank shafts 25—25 are the three rectangular shaped frames 28, one of these frames for each pair of cranks $a$, $b$ and $c$.

These frames 28 are provided with cross members 29 and upon these cross members 29 are the posts 30 each of which is provided with a bearing 31 at its upper end for embracing the corresponding crank on the crank shaft 25. It can be seen, that each pair of cranks support one of these frames 28 and that the frames 28 are further provided with cross members 32 from which spike or pin members 33 depend for engaging the material that rides up on the corrugated sieve 16 from the cutter bar 9.

A pair of spring arms 34 extends forwardly from the forward end of each of the frames 28 and attached to the back 35 of a brush 36 which rests upon the rear portion of the cutter bar as shown in Figure 2.

Pins 37 extend upwardly from the bowed end of the frame 28 through the spring arms 34. These pins 37 are provided with nuts 38 thereon and coiled compressible springs 29 are provided on these pins 37 and interposed between the nuts 38 and the arms 34 so as to add spring tension to these arms.

Figure 5:
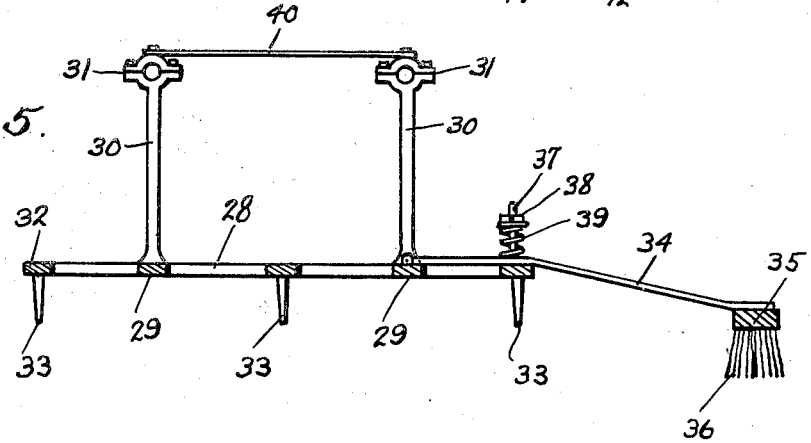
Figure 5 is a vertical sectional view through one of the jostling units of the seed gatherer.
Figure 6:
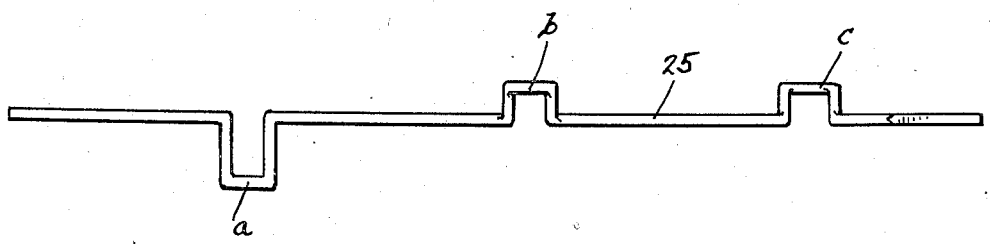
Figure 6 is an elevation of one of the crank shafts.

As is shown in Figure 5, the bearings 31—31 of each of the frames 28 is connected by a bridge piece 40.

In operation, as the shaft 20 is rotated, the crank shaft 25 is also rotated and these frames 28 are successively moved downwardly and upwardly as suggested in Figure 1 so as to afford a stepping or crawling motion of these agitators in contact with the material riding on to the disk 16 from the cutting operation. This motion of the toothed frames 28 eliminate the jamming up of the material on the sieve and in the agitating mechanism.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed as new is:

1. In combination with the cutter bar of a mowing machine, a seed pan projecting rearwardly from the cutter bar, a corrugated sieve mounted above the seed pan and provided with perforations in the grooves of the same, agitating means mounted above the said sieve for actuating the material riding on to the sieve so that seed from the material will sift through the openings therein, said agitating means consisting of an elongated crank shaft provided with a plurality of cranks therein, frame members each provided with depending teeth and having connections to corresponding cranks on the crank shaft, brushes mounted on the forward end of said frame for brushing off the said cutter bar, said brushes being provided with elongated spring arms, and supplemental spring means on the frames for urging the said brushes and arms downwardly.

2. In a seed gathering machine, a seed receiving pan, a sieve on the pan, agitating means on the sieve, said agitating means including a frame, a cutter assembly mounted in front of the seed pan, brush members adapted to rest on the cutter assembly, each of the said brush members including a spring arm attached at one end to a brush, and at its opposite end to the frame, upstanding members on the frame, said spring arms having openings therein through which the upstanding members extend, a nut feedable on each of the upstanding members, and a spring interposed between the nut on each of the upstanding members and the corresponding spring arms.

JAMES A. GAYLORD.